United States Patent
Ito

(10) Patent No.: US 11,319,443 B2
(45) Date of Patent: May 3, 2022

(54) AROMATIC POLYSULFONE COMPOSITION

(71) Applicant: SUMITOMO CHEMICAL COMPANY, LIMITED, Tokyo (JP)

(72) Inventor: Kazuyuki Ito, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 186 days.

(21) Appl. No.: 16/631,314

(22) PCT Filed: Jul. 18, 2018

(86) PCT No.: PCT/JP2018/026902
§ 371 (c)(1),
(2) Date: Jan. 15, 2020

(87) PCT Pub. No.: WO2019/017383
PCT Pub. Date: Jan. 24, 2019

(65) Prior Publication Data
US 2020/0207984 A1  Jul. 2, 2020

(30) Foreign Application Priority Data
Jul. 18, 2017  (JP) .............................. JP2017-138721

(51) Int. Cl.
*C08L 81/06* (2006.01)
*C08J 7/12* (2006.01)

(52) U.S. Cl.
CPC .................. *C08L 81/06* (2013.01); *C08J 7/12* (2013.01); *C08L 2205/02* (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| 4,656,207 A | 4/1987 | Jabloner et al. |
| 5,036,146 A | 7/1991 | Hedtmann-Rein et al. |
| 2012/0059144 A1 | 3/2012 | Tonelli et al. |

FOREIGN PATENT DOCUMENTS

| CN | 102482410 A | 5/2012 |
| EP | 0 254 455 A2 | 1/1988 |

(Continued)

OTHER PUBLICATIONS

Jurek M J et al: "Synthesis and characterization of amine terminated poly(arylene ether sulphone) oligomers", Polymer, Elsevier Science Publishers B.V, GB, vol. 30, No. 8, Aug. 1, 1989 (Aug. 1, 1989), pp. 1552-1557.

(Continued)

*Primary Examiner* — Shane Fang
(74) *Attorney, Agent, or Firm* — McDermott Will & Emery LLP

(57) ABSTRACT

The present invention relates to an aromatic polysulfone composition including an aromatic polysulfone (P1) and an aromatic polysulfone (P2) different from the aromatic polysulfone (P1), in which the (P1) contains an amino group-containing aromatic polysulfone which has an amino group at a polymer chain terminal and of which a weight-average absolute molecular weight (Mw) is less than 20,000 g/mol, the (P2) substantially consists of a repeating unit represented by General Formula (A) and a glass transition temperature (Tg) of the (P2) is higher than or equal to 222° C., and the weight-average absolute molecular weight (Mw) of the aromatic polysulfone composition is larger than the weight-average absolute molecular weight (Mw) of the amino group-containing aromatic polysulfone.

6 Claims, 1 Drawing Sheet

(56) References Cited

FOREIGN PATENT DOCUMENTS

| JP | 63-072756 A | 4/1988 |
|---|---|---|
| JP | 02-215837 A | 8/1990 |
| JP | 07-150035 A | 6/1995 |
| JP | 2003-126664 A | 5/2003 |
| JP | 2005-036095 A | 2/2005 |
| JP | 2013-206788 A | 10/2013 |
| JP | 2015-507034 A | 3/2015 |
| KR | 10-2013-0016698 A | 2/2013 |
| WO | 97/22406 A1 | 6/1997 |
| WO | 2013/031989 A1 | 3/2013 |
| WO | 2013/087592 A2 | 6/2013 |

OTHER PUBLICATIONS

James H. Kawakami et al: "High temperature polymers. I.—Sulfone Ether Diamines as Intermediates for Tractable High Temperature Polymers", Journal of Polymer Science, Polymer Chemistry Edition., vol. 12, No. 3, Mar. 1, 1974 (Mar. 1, 1974), pp. 565-573.
Extended European Search Report issued in corresponding European Patent Application No. 18836007.7-1107, dated Oct. 27, 2020.
International Search Report issued in corresponding International Patent Application No. PCT/JP2018/026902, dated Aug. 28, 2018, with English translation.
Chinese Office Action issued in corresponding Chinese Patent Application No. 201880047191.3, dated Sep. 28, 2021, with English translation.

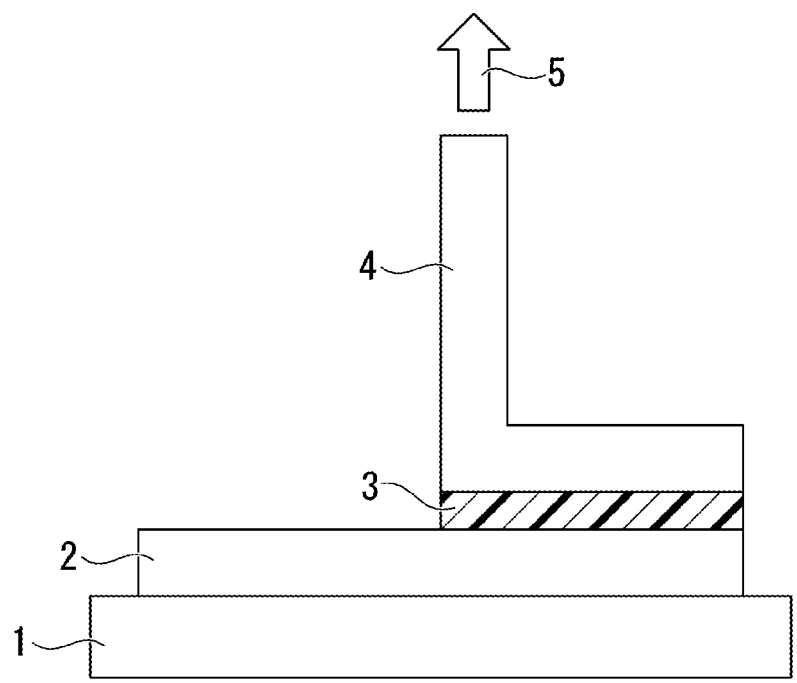

AROMATIC POLYSULFONE COMPOSITION

CROSS REFERENCE TO RELATED APPLICATIONS

This application is the U.S. National Phase under 35 U.S.C. 371 of International Application No. PCT/JP2018/026902, filed on Jul. 18, 2018, which claims the benefit of Japanese Application No. 2017-138721, filed on Jul. 18, 2017, the entire contents of each are hereby incorporated by reference.

TECHNICAL FIELD

The present invention relates to an aromatic polysulfone composition.

BACKGROUND ART

An aromatic polysulfone is one of amorphous thermoplastic resins. Since an aromatic polysulfone has excellent heat resistance, mechanical characteristics, or transparency, it is used as a molded body or a film forming material in various applications such as parts of an electronic device. In addition, an aromatic polysulfone is also used for an adhesive. An aromatic polysulfone is suitable as a modifier for epoxy resin. For this reason, an aromatic polysulfone is suitably used when processing an adhesive containing epoxy resin into a sheet shape or a film shape.

For example, an adhesive composition containing epoxy resin, a curing agent, and aromatic polyethersulfone is disclosed in Patent Document 1.

CITATION LIST

Patent Literature

[Patent Document 1] Japanese Unexamined Patent Application, First Publication No. 2005-36095

DISCLOSURE OF INVENTION

Technical Problem

In a case where an aromatic polysulfone is used as an adhesive, a high adhesive force is desired. There is room for improvement in existing an aromatic polysulfone from the viewpoint of exhibiting a high adhesive force.

The present invention has been made from the viewpoint of the above-described circumstances, and an object of the present invention is to provide an aromatic polysulfone composition that exhibits a high adhesive force.

Solution to Problem

The present inventors have conducted extensive studies, and as a result, they have found that an aromatic polysulfone composition containing a specific amino group-containing aromatic polysulfone having an amino group at a polymer chain terminal and a specific aromatic polysulfone different from the amino group-containing aromatic polysulfone exhibits high adhesiveness.

That is, the present invention has the following aspects.

[1] An aromatic polysulfone composition including an aromatic polysulfone (P1) and an aromatic polysulfone (P2) different from the aromatic polysulfone (P1), in which the aromatic polysulfone (P1) contains an amino group-containing aromatic polysulfone which has an amino group at a polymer chain terminal and of which a weight-average absolute molecular weight (Mw) is less than 20,000 g/mol, the aromatic polysulfone (P2) substantially consists of a repeating unit represented by General Formula (A) and a glass transition temperature (Tg) of the aromatic polysulfone (P2) is higher than or equal to 222° C., and a weight-average absolute molecular weight (Mw) of the aromatic polysulfone composition is larger than the weight-average absolute molecular weight (Mw) of the amino group-containing aromatic polysulfone,

-Ph1-SO$_2$-Ph2-O— (A)

where Ph1 and Ph2 each independently represent a phenylene group which may have a substituent.

[2] The aromatic polysulfone composition according to [1], in which a weight-average absolute molecular weight (Mw) of the aromatic polysulfone (P1) is less than 20,000 g/mol, and a weight-average absolute molecular weight (Mw) of the aromatic polysulfone (P2) is greater than or equal to 22,000 g/mol.

[3] The aromatic polysulfone composition according to [1] or [2], in which a molecular weight distribution of the aromatic polysulfone composition is greater than or equal to 1.95.

[4] The aromatic polysulfone composition according to any one of [1] to [3], in which a glass transition temperature (Tg) of the aromatic polysulfone composition is higher than or equal to 217° C.

[5] The aromatic polysulfone composition according to any one of [1] to [4], in which the aromatic polysulfone (P1) substantially consists of a repeating unit represented by General Formula (A) and has an amino group at a polymer chain terminal,

-Ph1-SO$_2$-Ph2-O— (A)

where Ph1 and Ph2 each independently represent a phenylene group which may have a substituent.

[6] The aromatic polysulfone composition according to any one of [1] to [5], in which the aromatic polysulfone (P2) has one or more selected from the group consisting of a halogen group, a hydroxy group, a methoxy group, and a phenyl group at a polymer chain terminal.

[7] The aromatic polysulfone composition according to any one of [1] to [6], in which a reduced viscosity (unit: dL/g) of the aromatic polysulfone (P2) is higher than or equal to 0.32.

Advantageous Effects of Invention

According to the present invention, it is possible to provide an aromatic polysulfone composition that exhibits a high adhesive force.

BRIEF DESCRIPTION OF THE DRAWINGS

FIG. 1 is a schematic diagram showing a test condition for a peel strength test.

BEST MODE FOR CARRYING OUT THE INVENTION

<Aromatic Polysulfone Composition>

An aromatic polysulfone composition of the present invention contains an aromatic polysulfone (P1) and an aromatic polysulfone (P2) different from the aromatic polysulfone (P1).

Hereinafter, the aromatic polysulfone (P1) is sometimes described as a "component (P1)". The aromatic polysulfone (P2) different from the aromatic polysulfone (P1) is sometimes described as a "component (P2)".

The component (P1) contains an amino group-containing aromatic polysulfone having an amino group at a polymer chain terminal. A weight-average absolute molecular weight (Mw) of the component (P1) is less than 20,000 g/mol.

The component (P2) substantially consists of a repeating unit represented by General Formula (A). The weight-average absolute molecular weight (Mw) of the component (P2) is greater than or equal to 22,000 g/mol, and the glass transition temperature (Tg) thereof is higher than or equal to 222° C.

Furthermore, a weight-average absolute molecular weight (Mw) of the aromatic polysulfone composition is larger than the weight-average absolute molecular weight (Mw) of the amino group-containing aromatic polysulfone.

(Ph1 and Ph2 each independently represent a phenylene group which may have a substituent.)

Hereinafter, the present invention will be described in detail.

<<Component (P1)>>

The component (P1) contains an amino group-containing aromatic polysulfone having an amino group at a polymer chain terminal. In the present specification, the amino group-containing aromatic polysulfone is sometimes described as a "(P1$^{pes}$)".

It is preferable that the component (P1) substantially consists of only (P1$^{pes}$). Impurities or the like contained in a raw material monomer of (P1$^{pes}$) may be included in the present embodiment. The impurities are sometimes described as an "impurity component (P1)". Examples of the impurity component (P1) include by-products generated when an amino group-containing aromatic polysulfone is polymerized. Another example thereof includes one in which modification at a terminal using an amino group is incomplete. Specific examples thereof include an aromatic polysulfone and the like which consists of a repeating unit represented by General Formula (A), but does not have an amino group at a polymer chain terminal.

The term "substantially" in the present specification means that a structure resulting from a raw material monomer or a structure resulting from impurities or the like contained in a raw material monomer may be slightly contained. The expression "slightly contained" referred to herein means that, greater than 0 and less than or equal to 40 mass % thereof, preferably greater than 0 and less than or equal to 30 mass % thereof, more preferably greater than 0 and less than or equal to 20 mass % thereof, still more preferably greater than 0 and less than or equal to 10 mass % thereof, and particularly preferably greater than 0 and less than or equal to 5 mass % thereof is contained based on the total amount of (P1$^{pes}$).

In addition, in the present embodiment, the expression "slightly contained" may include 0 mass %.

(P1$^{pes}$) consists of a repeating unit represented by General Formula (A) and has an amino group (—NH$_2$) at a polymer chain terminal.

(Ph1 and Ph2 each independently represent a phenylene group which may have a substituent.)

In General Formula (A), the phenylene group represented by either Ph1 or Ph2 may be independently a p-phenylene group, an m-phenylene group, or an o-phenylene group. In the present embodiment, the phenylene group is preferably a p-phenylene group.

Examples of substituents which may be included in the phenylene group include an alkyl group, an aryl group, and a halogen atom.

The alkyl group with which a hydrogen atom of the phenylene group may be substituted is preferably an alkyl group having 1 to 10 carbon atoms. Examples of the alkyl group having 1 to 10 carbon atoms include a methyl group, an ethyl group, an n-propyl group, an isopropyl group, an n-butyl group, an isobutyl group, an sec-butyl group, a tert-butyl group, an n-pentyl group, an n-hexyl group, an n-heptyl group, a 2-ethylhexyl group, an n-octyl group, and an n-decyl group.

The aryl group with which a hydrogen atom of the phenylene group may be substituted is preferably an aryl group having 6 to 20 carbon atoms. Example of the aryl group having 6 to 20 carbon atoms include a phenyl group, an o-tolyl group, an m-tolyl group, a p-tolyl group, a 1-naphthyl group, and a 2-naphthyl group.

Examples of the halogen atom with which a hydrogen atom of the phenylene group may be substituted include a fluorine atom, a chlorine atom, a bromine atom, and an iodine atom.

In a case where a hydrogen atom of the phenylene group is substituted with these functional groups, the number of substituents for each phenylene group is preferably less than or equal to two and more preferably one.

A hydrogen atom of the phenylene group may be or may not be substituted. In the present embodiment, it is particularly preferable that the hydrogen atom is not substituted.

In the present embodiment, (P1$^{pes}$) may have an amino group at least one terminal of a polymer chain. In the present embodiment, (P1$^{pes}$) preferably has an amino group at both terminals of a polymer chain from the viewpoint of exhibiting a higher adhesive force. That is, a polymer having an amino group at one terminal of a polymer chain and a polymer having an amino group at both terminals of a polymer chain are contained in (P1$^{pes}$).

Here, the "terminal of a polymer chain" means a terminal of a main chain of a polymer. The "main chain of a polymer" means, for example, a longest molecular chain among molecular chains which have a constitutional unit represented by General Formula (A) or General Formula (A)-1 and included in (P1$^{pes}$).

In the present embodiment, General Formula (A) may be General Formula (A)-1.

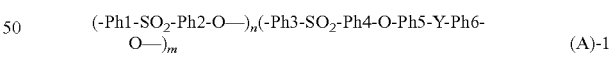

(Ph1 to Ph6 each independently represent a phenylene group which may have a substituent. Y is a single bond or a linear, branched, or cyclic alkylene group having 1 to 5 carbon atoms. n is an integer of 1 to 2,000, and m is an integer of 0 to 2,000.)

The description relating to the phenylene groups Ph1 to Ph6, which may have a substituent, in General Formula (A)-1 is the same as that of the phenylene group Ph1 or Ph2 in General Formula (A).

In a case where hydrogen atoms of the phenylene groups Ph1 to Ph6 in General Formula (A)-1 are substituted, the number of substituents for each phenylene group is preferably less than or equal to two and more preferably one.

Hydrogen atoms of the phenylene groups may be or may not be substituted. In the present embodiment, it is particularly preferable that the hydrogen atoms are not substituted.

In General Formula (A)-1, Y is a single bond or a linear, branched, or cyclic alkylene group having 1 to 5 carbon atoms. Specific examples thereof include a methylene group [—$CH_2$—], an ethylene group [—$(CH_2)_2$—], a trimethylene group [—$(CH_2)_3$—], a tetramethylene [—$(CH_2)_4$—], and a pentamethylene group [—$(CH_2)_5$—]. Specific examples of the branched alkylene group include —$CH(CH_3)$—, —$CH(CH_2CH_3)$—, and —$C(CH_3)_2$—. An example of the cyclic alkylene group includes a cyclohexylene group obtained by removing two hydrogen atoms from cyclohexane. In the present embodiment, the branched alkylene group is preferable.

In General Formula (A)-1, n is an integer of 1 to 2,000, and m is an integer of 0 to 2,000. m may be 0 or an integer of 1 to 2,000.

In the present embodiment, ($P1^{pes}$) may have an amino group at a polymer chain terminal. As for the structure of the polymer chain terminal, an amino group (—$HN_2$) preferably bonds to a phenyl group, and an amino group (—$HN_2$) may bond to a phenylene group through a divalent linking group. An example of the "divalent linking group" referred to herein includes an alkylene group having 1 to 5 carbon atoms.

In the present embodiment, ($P1^{pes}$) is preferably a polymer compound consisting of a repeating unit represented by General Formula (A) or a polymer compound consisting of a repeating unit represented by General Formula (A)-1, and more preferably a polymer compound consisting of a repeating unit represented by General Formula (A).

(Weight-Average Absolute Molecular Weight)

In the present embodiment, the weight-average absolute molecular weight (Mw) of the component (P1) is less than 20,000 g/mol, preferably less than or equal to 19,500 g/mol, more preferably less than or equal to 19,000 g/mol, and particularly preferably less than or equal to 18,900 g/mol.

The lower limit value of the weight-average absolute molecular weight is not particularly limited, and is, for example, greater than or equal to 100 g/mol, greater than or equal to 200 g/mol, and greater than or equal to 300 g/mol. Examples of a combination of an upper limit value and a lower limit value include greater than or equal to 100 g/mol and less than 20,000 g/mol, 200 g/mol to 19,500 g/mol, and 300 g/mol to 19,000 g/mol.

In the present embodiment, a high adhesive force can be exhibited by mixing a component (P1) with a low molecular weight, of which the weight-average absolute molecular weight (Mw) is less than or equal to the above-described upper limit value, with a component (P2) having a higher molecular weight than that of the component (P1).

In the present embodiment, the component (P1) substantially consists of only ($P1^{pes}$). For this reason, it is inferred that the weight-average absolute molecular weight (Mw) of the component (P1) is approximately coincident with the weight-average absolute molecular weight (Mw) of ($P1_{pes}$).

The absolute molecular weight can be calculated from multi-angles of a multi-angle light scattering photometer (MALS) by performing detection using, for example, a differential refractometer and the multi-angle light scattering photometer.

(Terminal Amino Group Content)

In the present embodiment, the number of amino groups at a polymer chain terminal is preferably greater than or equal to 0.1 per 100 repeating units represented by Formula (A), more preferably greater than or equal to 0.2, and particularly preferably greater than or equal to 0.5. The upper limit value of the number of the amino groups is not particularly limited, but is, for example, less than or equal to 10, less than or equal to 8, and less than or equal to 5 per 100 repeating units represented by Formula (A).

Examples of a combination of the upper limit value and the lower limit value include 0.1 to 10, 0.2 to 8, and 0.5 to 5. In a case where the terminal amino group content per 100 repeating units represented by Formula (A) is greater than or equal to the above-described lower limit value, the number of bonding sites to an adherend increases. Therefore, it is possible to exhibit a high adhesive force.

The number of amino groups at a polymer chain terminal of the component (P1) (substantially ($P1^{pes}$)) can be calculated based on measurement results of an NMR method.

Specifically, first, the component (P1) is dissolved in a solvent such as deuterated dimethyl sulfoxide. Next, in the $^1H$-NMR measurement, a peak surface area ($^1H_{NH2}$) of two protons bonding to carbons adjacent to aromatic carbons substituted with amino groups and a peak surface area ($^1H_{PES}$) of four protons adjacent to aromatic carbons derived from a repeating structure of an aromatic polysulfone are observed.

The amount of terminal amino groups per 100 repeating units represented by Formula (A) is calculated using the following formula based on the peak surface areas.

[Amount of terminal amino groups (per 100 units)]=
[peak surface area of $^1H_{NH2}$ when peak surface area of $^1H_{PES}$ is set as 100]×2

A specific example of the component (P1) used in the present embodiment will be described below. In the specific example shown below, n is a natural number of 1 to 2,000, and m is an integer of 1 to 2,000.

[Chem 1]

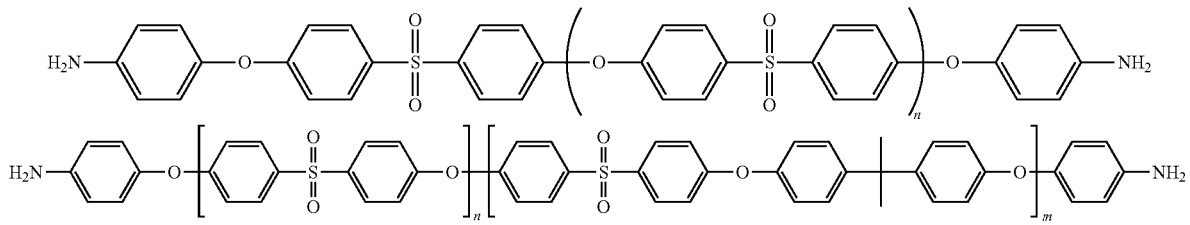

The component (P1) may have a linear polymer structure as shown in the above-described specific example, or may have a branched polymer structure having an amino group at a polymer terminal.

<<Component (P2)>>

The component (P2) is an aromatic polysulfone different from the component (P1) and substantially consists of a repeating unit represented by General Formula (A). However, the component (P2) does not contain a component having an amino group (—NH$_2$) at a polymer chain terminal among components consisting of a repeating unit represented by General Formula (A).

-Ph1-SO$_2$-Ph2-O—  (A)

(Ph1 and Ph2 each independently represent a phenylene group which may have a substituent.)

The description relating to Ph1 and Ph2 in General Formula (A) of the component (P2) is the same as the description relates to Ph1 and Ph2 in General Formula (A) of the component (P1).

In the present embodiment, the component (P2) preferably has one or more selected from the group consisting of a halogen group, a hydroxy group, a methoxy group, and a phenyl group at a polymer chain terminal.

Examples of a halogen atom include a fluorine atom, a chlorine atom, a bromine atom, and an iodine atom. Among these, a chlorine atom is preferable.

In the present embodiment, commercially available products can also be used as the component (P2). Examples of the commercially available products include SUMIKA EXCELS 3600P, 4100P, 4800P, and 5200P which are polyethersulfone resins manufactured by Sumitomo Chemical Co., Ltd.

(Weight-Average Absolute Molecular Weight)

In the present embodiment, the weight-average absolute molecular weight (Mw) of the component (P2) is greater than or equal to 22,000 g/mol, preferably greater than or equal to 24,000 g/mol, and more preferably greater than or equal to 26,000 g/mol.

The upper limit value of the weight-average absolute molecular weight (Mw) of the component (P2) is not particularly limited, and is, for example, less than or equal to 200,000 g/mol, less than or equal to 150,000 g/mol, and less than or equal to 100,000 g/mol.

Examples of a combination of an upper limit value and a lower limit value include 22,000 g/mol to 200,000 g/mol, 24,000 g/mol to 150,000 g/mol, and 26,000 g/mol to 100,000 g/mol.

In the aromatic polysulfone composition of the present embodiment, it is possible to improve the adhesive strength by mixing the component (P1) with the component (P2) having a higher molecular weight than that of the component (P1).

(Glass Transition Temperature)

In the present embodiment, the glass transition temperature (Tg) of the component (P2) is higher than or equal to 222° C., more preferably higher than or equal to 223° C., and particularly preferably higher than or equal to 224° C.

The upper limit value of the glass transition temperature is not particularly limited, and is, for example, lower than or equal to 250° C., lower than or equal to 240° C., and lower than or equal to 230° C.

The above-described upper limit value and lower limit value of the glass transition temperature can be arbitrarily combined.

Examples of the combination of the upper limit value and the lower limit value include 222° C. to 250° C., 223° C. to 240° C., and 224° C. to 230° C.

The glass transition temperature can be measured, for example, through a method according to JIS-K7121.

In the present embodiment, a high adhesive force can be exhibited in a case where the glass transition temperature is higher than or equal to the above-described lower limit value.

(Reduced Viscosity)

In the present embodiment, the reduced viscosity (unit: dL/g) of the component (P2) is preferably higher than or equal to 0.32 and more preferably higher than or equal to 0.35. The higher the reduced viscosity of the component (P2), the higher the adhesive force can be.

The upper limit value of the reduced viscosity is not particularly limited, and is, for example, lower than or equal to 0.80, lower than or equal to 0.75, and lower than or equal to 0.7.

In the present embodiment, the reduced viscosity can be measured, for example, using an Ostwald-type viscometer. The above-described upper limit value and lower limit value of the reduced viscosity can be arbitrarily combined.

In the present embodiment, the combination thereof is preferably 0.32 to 0.8 and more preferably 0.35 to 0.75.

In the present embodiment, the content of the component (P1) in the aromatic polysulfone composition is preferably greater than or equal to 5 mass %, more preferably greater than or equal to 10 mass %, and particularly preferably greater than or equal to 15 mass %. In a case where the proportion of the component (P1) is greater than or equal to the above-described lower limit value, the adhesive force of the aromatic polysulfone composition is further improved.

In the present embodiment, the content of the component (P1) in the aromatic polysulfone composition can be measured through the following measurement method. The component (P1) and (P2) can be analyzed through the following measurement method.

[Measurement Method]

First, the aromatic polysulfone composition is separated and fractionated for each molecular weight through gel permeation chromatography (GPC).

The content and molecular weight of the components (P1) and (P2) are calculated from analysis results of the polymer weight and the terminal amino group amount after the fractionation.

Resins Other than Components (P1) and (P2)

The aromatic polysulfone composition of the present embodiment may contain resins other than the above-described components (P1) and (P2).

Examples of resins other than aromatic polysulfone include polyamide, polyester, polyphenylene sulfide, polycarbonate, polyphenylene ether, aromatic polyketone, polyether imide, phenolic resin, epoxy resin, polyimide resin, and a modified product thereof. In the present embodiment, epoxy resin is preferable among the above.

Organic Solvent

The aromatic polysulfone composition of the present embodiment may further contain an organic solvent. The organic solvent may be added when preparing the aromatic polysulfone composition, or may be contained in advance in an aromatic polysulfone. The same organic solvent as exemplified in a production method of the present embodiment to be described below can be used as such an organic solvent.

<Other Components>

The aromatic polysulfone composition of the present embodiment can contain various materials as necessary as long as the effect of the present embodiment is not impaired. Examples of such materials include coloring components, lubricants, various surfactants, antioxidants, thermal stabilizers, other various stabilizers, ultraviolet absorbing agents, and antistatic agents.

In the present embodiment, the molecular weight distribution of the aromatic polysulfone composition is preferably greater than or equal to 1.95, more preferably 1.98, and particularly preferably 2.00.

The upper limit value of the molecular weight distribution of the aromatic polysulfone composition is not particularly limited, and is, for example, lower than or equal to 5.0, lower than or equal to 4.5, and lower than or equal to 4.0.

The above-described upper limit value and lower limit value can be arbitrarily combined.

In the present embodiment, the combination thereof is preferably 1.95 to 5.0, more preferably 1.98 to 4.5, and particularly preferably 2.00 to 4.0.

In the present embodiment, the glass transition temperature (Tg) of the aromatic polysulfone composition is preferably higher than or equal to 217° C., more preferably 218° C., and particularly preferably 219° C. The glass transition temperature can be measured through the same method as described above.

The upper limit value of the glass transition temperature of the aromatic polysulfone composition is not particularly limited, and is, for example, lower than or equal to 250° C., lower than or equal to 240° C., and lower than or equal to 230° C.

The above-described upper limit value and lower limit value can be arbitrarily combined.

In the present embodiment, the combination thereof is preferably 217° C. to 250° C., more preferably 218° C. to 240° C., and particularly preferably 219° C. to 230° C.

(Weight-Average Absolute Molecular Weight)

In the present embodiment, the weight-average absolute molecular weight (Mw) of the aromatic polysulfone composition is larger than the weight-average absolute molecular weight (Mw) of ($P1^{pes}$). The weight-average absolute molecular weight (Mw) of the aromatic polysulfone composition is, for example, 1,000 g/mol, 2,000 g/mol, or 3,000 g/mol larger than the weight-average absolute molecular weight (Mw) of ($P1^{pes}$).

<Method for Producing Aromatic Polysulfone (P1)>

The aromatic polysulfone (P1) can be produced through the following method.

The method for producing an aromatic polysulfone (P1) will be described as an embodiment of the present invention. The method for producing an aromatic polysulfone (P1) is substantially a method for producing an amino group-containing aromatic polysulfone.

The method for producing an aromatic polysulfone (P1) preferably includes a step of condensing an aromatic halogenosulfone compound and an amino compound and polycondensing a phenoxy terminal or a phenolate terminal and a halogen terminal which are by-producted. In this step, it is preferable to produce an aromatic polysulfone (P1) by mixing the compounds so that a molar ratio of the amino group to the halogen atom at a terminal of the aromatic halogenosulfone compound becomes less than 1.0 and causing a reaction while heating the mixture at a temperature higher than 180° C.

Aromatic Halogenosulfone Compound

Compound (4) or (5) can be used as the aromatic halogenosulfone compound to be used in the present embodiment.

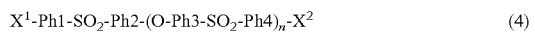

[In Formula (4), $X^1$ and $X^2$ each independently represent a halogen atom. Ph1 and Ph2 are as defined above. Ph3 and Ph4 represent a phenylene group which may have a substituent. n is an integer of 0 to 2,000.]

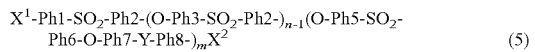

[Ph1 to Ph8 each independently represent a phenylene group which may have a substituent. Y is a single bond or a linear, branched, or cyclic alkylene group having 1 to 5 carbon atoms. n is an integer of 1 to 2,000, and m is an integer of 0 to 2,000.]

The description of the phenylene groups, which are represented by Ph3 to Ph8 and may have a substituent, in Compound (4) or (5) is the same as that of the phenylene groups, which may have a substituent, in Ph1 and Ph2.

In a case where hydrogen atoms of the phenylene groups Ph1 to Ph8 in Compound (4) or (5) are substituted, the number of substituents for each phenylene group is preferably less than or equal to two and more preferably one.

Hydrogen atoms of the phenylene groups may be or may not be substituted. In the present embodiment, it is particularly preferable that the hydrogen atoms are not substituted.

Examples of Compound (4) include bis(4-chlorophenyl) sulfone and 4-chlorophenyl-3'4'-dichlorophenyl sulfone. In addition, commercially available products such as "SUMIKA EXCEL PES3600P" and "SUMIKA EXCEL PES4100P" manufactured by Sumitomo Chemical Co., Ltd. can also be used as the aromatic halogenosulfone compound.

Amino Compound

Examples of amino compound that can be used in the present embodiment include 4-aminophenol, 3-aminophenol, 2,4-diaminophenol, 2,5-diaminophenol, 3-aminophenol, and 4-(2-aminoethyl) phenol. Among these, 4-aminophenol and 3-aminophenol are preferable in the present embodiment.

The aromatic polysulfone (P1) produced according to the present embodiment substantially consists of only a repeating unit represented by General Formula (A) and contains an amino group-containing aromatic polysulfone ($P1^{pes}$) having an amino group at a polymer chain terminal. The aromatic polysulfone (P1) produced according to the present embodiment preferably contains 60 mass % or more of ($P1^{pes}$) and more preferably contains only ($P1^{pes}$) as described above.

Examples of components other than ($P1^{pes}$) include by-products generated when polymerizing ($P1^{pes}$). Another example thereof includes one in which modification at a terminal using an amino group is incomplete. That is, the example thereof includes an aromatic polysulfone which consists of a repeating unit represented by General Formula (A), but does not have an amino group at a polymer chain terminal. For this reason, the method for producing an aromatic polysulfone (P1) of the present embodiment is substantially a method for producing an amino group-containing aromatic polysulfone.

A step of condensing an aromatic halogenosulfone compound and an amino compound and polycondensing a compound having a phenoxy terminal or a compound having a phenolate terminal and compound having a halogen terminal which are by-producted will be described. Hereinafter, this step is described as a "polycondensation step".

The polycondensation step is a step of condensing an aromatic halogenosulfone compound and an amino compound and polycondensing a compound having a phenoxy terminal or a compound having a phenolate terminal and compound having a halogen terminal which are by-producted. The polycondensation step is preferably performed using alkali metal carbonate as a base, more preferably performed in an organic solvent which is a polymerization solvent, and particularly preferably performed in an organic solvent using an alkali metal salt of carbonic acid as a base.

The alkali metal salt of carbonic acid may be alkali carbonate, which is a normal salt, that is, carbonate of alkali metal, or may be alkali bicarbonate, which is an acid salt, that is, alkali hydrogen carbonate or hydrogen carbonate of alkali metal. In addition, the alkali metal salt of carbonic acid may be a mixture of the above-described alkali carbonate and alkali bicarbonate.

Sodium carbonate, potassium carbonate, or the like is preferable as the alkali carbonate.

Sodium bicarbonate (sodium hydrogen carbonate), potassium bicarbonate (potassium hydrogen carbonate), or the like is preferable as the alkali bicarbonate.

The organic solvent is preferably a polar organic solvent.

Examples of the polar organic solvent include dimethyl sulfoxide, 1-methyl-2-pyrrolidone (also referred to as NMP), sulfolane (also referred to as 1,1-dioxolane), 1,3-dimethyl-2-imidazolidinone, 1,3-diethyl-2-imidazolidinone, dimethyl sulfone, diethyl sulfone, diisopropyl sulfone, and diphenyl sulfone.

In the present embodiment, it is preferable to mix an aromatic halogenosulfone compound with an amino compound so that a molar ratio of the amino group to a halogen atom at a terminal of the aromatic halogenosulfone compound becomes less than 1.0. The molar ratio is preferably less than or equal to 0.9 and more preferably less than or equal to 0.8. In a case where the amount of the amino compound mixed is within the above-described range, the residual amount of a compound having a phenoxy terminal or a compound having a phenolate terminal and compound having a halogen terminal which are by-producted is small. Therefore, it is possible to control the weight-average absolute molecular weight and the reduced viscosity to the above-described scope of the present invention.

Regarding the amount of alkali metal salt of carbonic acid used, the molar ratio of alkali metal to a halogen atom at a terminal of the aromatic halogenosulfone compound is preferably 0.9 to 1.2 and more preferably 0.95 to 1.15.

The larger the amount of alkali metal salt of carbonic acid used, the faster the intended polycondensation proceeds. However, in a case where the amount of alkali metal salt of carbonic acid is excessive, the amount of compound having a phenoxy terminal or compound having a phenolate terminal to be by-producted increases. For this reason, in a case where the amount of alkali metal salt of carbonic acid used is within the above-described ranges, the degree of polymerization of an amino group-containing aromatic polysulfone to be obtained increases. As a result, an aromatic polysulfone tends to have a higher reduced viscosity and higher weight-average absolute molecular weight.

In the method for producing an aromatic polysulfone (P1) of the present embodiment, it is preferable to dissolve an aromatic halogenosulfone compound and an amino compound in a polar organic solvent, add an alkali metal salt of carbonic acid to the obtained solvent, and polycondensate the aromatic halogenosulfone compound with the amino compound as a polycondensation step. Thereafter, it is possible to obtain an aromatic polysulfone by removing an unreacted alkali metal salt of carbonic acid, by-producted alkali halide, and the polar organic solvent from the reaction mixture obtained in the polycondensation step.

In the present embodiment, the heating temperature during polycondensation is higher than 180° C., preferably higher than or equal to 200° C., and more preferably 210° C. to 400° C. In a case where the heating temperature during polycondensation is higher than 180° C., the intended polycondensation proceeds rapidly. For this reason, the degree of polymerization of an aromatic polysulfone to be obtained increases. As a result, the amino group-containing aromatic polysulfone has a higher reduced viscosity and a high weight-average absolute molecular weight.

In the present embodiment, in a case of, for example, producing an amino group-containing aromatic polysulfone consisting of only a repeating unit represented by General Formula (A)-1, it is possible to use a compound having two phenolic hydroxyl groups in addition to the above-described aromatic halogenosulfone compound and amino compound. Examples of the compound having two phenolic hydroxyl groups include bisphenol A ($C_{15}H_{16}O_2$), bisphenol S ($C_{12}H_{10}O_4S$), and biphenol.

In the present embodiment, in a case of producing an amino group-containing aromatic polysulfone consisting of a repeating unit represented by General Formula (A)-1, it is preferable to react one or more selected from the group consisting of bisphenol A, bisphenol S, and biphenol are preferable in addition to the above-described aromatic halogenosulfone compound and amino compound and it is more preferable to react bisphenol A and the bisphenol S.

In addition, the polycondensation step preferably includes a heat insulation step of gradually raising the temperature while removing by-producted water to make the temperature reach a reflux temperature of the polar organic solvent, and subsequently keeping the reflux temperature. In the heat insulation step, the temperature is preferably kept for 1 hour to 50 hours and more preferably 2 hours to 30 hours. The longer the polycondensation time, the more the intended polycondensation proceeds. Therefore, the degree of polymerization of aromatic polysulfone to be obtained increases. As a result, the amino group-containing aromatic polysulfone tends to have a higher reduced viscosity and a greater absolute molecular weight.

An amino group-containing aromatic polysulfone is obtained by removing an unreacted alkali metal salt of carbonic acid, by-producted alkali halide, and the polar organic solvent from the reaction mixture obtained in the polycondensation step. The unreacted alkali metal salt of carbonic acid and the by-producted alkali halide may be removed through filtration, extraction, centrifugation before the removal of the polar organic solvent. The removal of the polar organic solvent may be performed by distilling off the polar organic solvent, or may be performed by mixing the mixture with a poor solvent of the amino group-containing aromatic polysulfone, precipitating the amino group-containing aromatic polysulfone, and separating the polar organic solvent from the mixture through filtration, centrifugation, or the like. It is possible to remove the unreacted alkali metal salt of carbonic acid, the by-producted alkali halide, and the polar organic solvent at the same time. Therefore, it is preferable to mix the mixture with a poor solvent of an aromatic polysulfone, in which the unreacted alkali metal salt of carbonic acid and the by-producted alkali halide can be dissolved, precipitate the amino group-containing aromatic polysulfone, and separate the polar organic solvent therefrom through filtration, centrifugation, or the like.

Examples of the poor solvent of an amino group-containing aromatic polysulfone include methanol, ethanol, 2-propanol, hexane, heptane, and water. Water is preferable since it is easily removed.

The aromatic polysulfone composition of the present invention can exhibit a high adhesive force by containing the components (P1) and (P2) which are specific aromatic polysulfones.

EXAMPLES

Hereinafter, the present invention will be described in more detail using examples, but is not limited to the following examples.

<Quantitative Determination Method of Amino Terminal>

The amount of terminal amino groups of an aromatic polysulfone was measured in a deuterated DMSO solvent using 400 MHz 1H-NMR.

Two protons ($^1H_{NH2}$) bonding to carbons adjacent to aromatic carbons substituted with amino groups from 6.6 ppm to 6.7 ppm and four protons ($^1H_{PES}$) adjacent to aromatic carbons derived from a repeating structure of an aromatic polysulfone from 7.9 ppm to 8.1 ppm are observed at a measurement temperature of 50° C. and 64 times of integration. Thereafter, the amount of terminal amino groups per 100 repeating units represented by Formula (A) will be calculated using the following formula.

[Amount of terminal amino groups (per 100 units)]=
[peak surface area of $^1H_{NH2}$ when peak surface
area of $^1H_{PES}$ is set as 100]×2

[Measurement Device]
NMR Device: Varian NMR System PS400WB
Magnetic field strength: 9.4 T (400 MHz)
Probe: Varian 400 DB AutoX WB Probe (5 mm)
Measurement Conditions
Measurement nucleus: $^1H$
Measurement method: single-pulse method
Measurement temperature: 50° C.
Deuterated solvent: DMSO-$d_6$ (containing TMS)
Waiting time: 10 sec
Pulse irradiation time: 11.9 μsec (90° C. pulse)
Number of times of integration: 64 times
External standard: TMS (0 ppm)

<Measurement of Glass Transition Temperature of Aromatic Polysulfone>

The glass transition temperature was calculated through a method according to JIS-K7121 using a differential scanning calorimeter (DSC-50 manufactured by Shimadzu Corporation). About 10 mg of a sample was weighed, and the temperature thereof was raised to 400° C. at a temperature rising rate of 10° C./min. Thereafter, the temperature thereof was cooled to 50° C. and was then raised to 400° C. again at a temperature rising rate of 10° C./min. The glass transition temperature was calculated through the method according to JIS-K7121 using a DSC chart obtained by the second temperature raising.

<Measurement of Mn and Mw of Aromatic Polysulfone and Calculation of Mw/Mn>

The weight-average absolute molecular weight (Mw) (unit: g/mol) of an aromatic polysulfone, the number-average absolute molecular weight (Mn), and the polydispersity (Mw/Mn) were obtained through GPC measurement. Mn and Mw were all measured twice, each average value was obtained as Mn and Mw, and the average value of Mw/Mn was obtained.

[Measurement Conditions]
Sample: 0.002 g of an aromatic polysulfone was formulated with 1 mL of a 10 mM lithium bromide-containing N,N-dimethylformamide solution.
Sample injection amount: 100 μL
Column (stationary phase): Two "TSKgel GMHHR-H" (7.8 mmφ×300 mm) manufactured by TOSOH CORPORATION were connected in series.
Column temperature: 40° C.
Eluent (mobile phase): 10 mM lithium bromide-containing N,N-dimethylformamide
Eluent flow rate: 0.8 mL/minute
Detector: differential refractometer (RI)+multi-angle light scattering photometer (MALS)
Standard reagent: Polystyrene
Molecular weight calculation method: the absolute molecular weight was calculated using a multi-angle light scattering photometer (MALS).

<Measurement of Reduced Viscosity of Aromatic Polysulfone>

About 1 g of an aromatic polysulfone was dissolved in N,N-dimethylformamide, and the volume of the solution was made to 1 dL. The viscosity (η) of the solution was measured at 25° C. using an Ostwald-type viscometer. In addition, the viscosity ($η_0$) of a solvent N,N-dimethylformamide was measured at 25° C. using the Ostwald-type viscometer. The specific viscosity ratio (($η-η_0$)/$η_0$) was obtained from the viscosity (η) of the solution and the viscosity ($η_0$) of the solvent and was divided by the concentration (about 1 g/dL) of the solution to obtain a reduced viscosity (dL/g) of an aromatic polysulfone.

<Peel Strength Test>

A peel strength test method will be described with reference to FIG. 1.

15 parts by mass of an aromatic polysulfone composition and 85 parts by mass of NMP were placed in a heating container, and the mixture was stirred for 2 hours at 60° C. to obtain a pale yellow aromatic polysulfone solution. 18 μm thick electrolytic copper foil was coated using a film applicator and was dried at 60° C. using a high-temperature hot-air dryer to form a coated film.

The coated film was subjected to heat treatment at 250° C. while allowing nitrogen to flow thereto to form a resin layer 3 on the copper foil.

18 μm thick electrolytic copper foil was superposed on a copper foil 2 including the resin layer 3 to form three layers of the copper foil 2, the resin layer 3, and a copper foil 4. The layers were press-bonded for 30 minutes at 3 MPa and 250° C. to obtain a laminate. The obtained laminate was adhered to a support 1 and used for measurement.

The laminate was pulled using an autograph at a tensile speed of 5 mm/minute and an angle of 90° C. shown by a reference numeral 5, and a peeling strength in an atmosphere of 23° C. and a humidity of 50%.

<<Production of Aromatic Polysulfone (P1)>>

1.75 g of aminophenol, 1.33 g of potassium carbonate, and 180 g of N-methyl-2-pyrrolidone were mixed with each other in a polymerization tank including a stirrer, a nitrogen introduction pipe, a thermometer, and a condenser with a receiver at a distal end, the temperature was raised to 100° C., and 120 g of polyethersulfone (SUMIKA EXCEL PES3600P manufactured by Sumitomo Chemical Co., Ltd.) was added thereto. The amount of the aminophenol to the chloro terminal amount of the polyethersulfone was 1 (molar ratio), and the molar ratio of an alkali metal atom to a chloro terminal of the polyethersulfone was 1.20. After polyethersulfone was dissolved, the solution was heated at 200° C. (at an internal temperature of about 180° C.) to cause a reaction for 8 hours.

Subsequently, the obtained reaction mixture solution was diluted with NMP and cooled at room temperature to precipitate unreacted potassium carbonate and by-producted potassium carbonate. The above-described solution was added dropwise to water, an aromatic polysulfone was precipitated, and unnecessary NMP was removed through filtration to obtain a precipitate.

The obtained precipitate was carefully washed repeatedly with water and heat-dried at 150° C. to obtain an amino group-containing aromatic polysulfone having an amino group at a terminal.

The terminal amino group amount, Tg, the weight-average absolute molecular weight (Mw), the polydispersity (Mw/Mn), and the peeling strength are shown in Table 1. In Table 1, the number of amino groups at a polymer chain terminal per 100 repeating units represented by Formula (A) is described as a "terminal amino group amount".

Comparative Example 1 shown in Table 1 is an aromatic polysulfone consisting of an aromatic polysulfone (P1). For this reason, the molecular weight described in Comparative Example 1 means an average molecular weight of an aromatic polysulfone (P1). The component (P1) substantially consists of (P1$^{pes}$). For this reason, the weight-average absolute molecular weight (Mw) of Comparative Example 1 substantially means a weight-average absolute molecular weight (Mw) of (P1$_{pes}$). That is, it means that the weight-average absolute molecular weight (Mw) of (P1$^{pes}$) is 16,100 g/mol.

<<Aromatic Polysulfone (P2)>>

Polyethersulfone as an aromatic polysulfone having a chlorine atom at a terminal, and SUMIKA EXCEL PES3600P (reduced viscosity of 0.36 dl·g) manufactured by Sumitomo Chemical Co., Ltd. were used. The terminal amino group amount, Tg, the weight-average absolute molecular weight (Mw), the polydispersity (Mw/Mn), and the peeling strength are shown in Table 1.

<Production of Aromatic Polysulfone Composition>

An aromatic polysulfone (P1) was mixed with an aromatic polysulfone (P2) at a ratio of 75:25 (mass ratio), 50:50 (mass ratio), 25:75 (mass ratio), 12.5:87.5 (mass ratio), and 10:90 (mass ratio) to produce aromatic polysulfone compositions of Examples 1 to 5. Results when a peel strength test was performed using these compositions and values of terminal amino group amount calculated from the mixing ratios of P1 and P2 are shown in Table 1.

TABLE 1

| | Mixing ratio | | | Peel strength | | |
| | Aromatic polysulfone (P1) | Aromatic polysulfone (P2) | Terminal amino group amount | Tg (° C.) | (N/cm²) n = 6 average | Weight-average absolute molecular weight | |
|---|---|---|---|---|---|---|---|
| | | | | | | Mw | Mw/Mn |
| Comparative Example 1 | 100 | 0 | 3.0 | 216 | 7.3 | 16100 | 1.92 |
| Example 1 | 75 | 25 | 2.3 | 218 | 9.0 | 18700 | 1.99 |
| Example 2 | 50 | 50 | 1.5 | 218 | 10.1 | 21000 | 2.18 |
| Example 3 | 25 | 75 | 0.8 | 221 | 10.6 | 23200 | 2.3 |
| Example 4 | 12.5 | 87.5 | 0.4 | 222 | 8.7 | 24400 | 2.27 |
| Example 5 | 10 | 90 | 0.3 | 223 | 8.1 | 24600 | 2.37 |
| Comparative Example 2 | 0 | 100 | Undetected | 225 | 3.9 | 26400 | 2.55 |

As described in the above-described results, the peel strength of the aromatic polysulfone compositions of Examples 1 to 5 increased by an average of about 2.0 N/cm² compared to the aromatic polysulfone composition of Comparative Example 1 which contains only the component (P1), and the adhesive force thereof was improved.

In addition, the peel strength of Examples 1 to 5 increased by about 2 to 3 times compared to the aromatic polysulfone composition of Comparative Example 2 which contains only the component (P2), and the adhesive force thereof was improved.

INDUSTRIAL APPLICABILITY

The present invention can provide an aromatic polysulfone composition exhibiting high adhesiveness, and therefore, is industrially extremely useful.

REFERENCE SIGNS LIST

1 . . . support
2,4 . . . copper foil
3 . . . resin layer

The invention claimed is:

1. An aromatic polysulfone composition comprising:
an aromatic polysulfone (P1); and
an aromatic polysulfone (P2) different from the aromatic polysulfone (P1),
wherein the aromatic polysulfone (P1) contains an amino group-containing aromatic polysulfone which has an amino group at a polymer chain terminal,
wherein the aromatic polysulfone (P1) substantially consists of a repeating unit represented by General Formula (A), and of which a weight-average absolute molecular weight (Mw) is less than 20,000 g/mol,
wherein the aromatic polysulfone (P2) substantially consists of a repeating unit represented by General Formula (A) and a glass transition temperature (Tg) of the aromatic polysulfone (P2) is higher than or equal to 222° C., and
wherein a weight-average absolute molecular weight (Mw) of the aromatic polysulfone composition is larger than the weight-average absolute molecular weight (Mw) of the amino group-containing aromatic polysulfone, $$-Ph1-SO_2-Ph2-O— \qquad (A)$$

where Ph1 and Ph2 each independently represent a phenylene group which may have a substituent.

2. The aromatic polysulfone composition according to claim 1,
wherein a weight-average absolute molecular weight (Mw) of the aromatic polysulfone (P1) is less than 20,000 g/mol, and
wherein a weight-average absolute molecular weight (Mw) of the aromatic polysulfone (P2) is greater than or equal to 22,000 g/mol.

3. The aromatic polysulfone composition according to claim 1, wherein a molecular weight distribution of the aromatic polysulfone composition is greater than or equal to 1.95.

4. The aromatic polysulfone composition according to claim 1,
wherein a glass transition temperature (Tg) of the aromatic polysulfone composition is higher than or equal to 217° C.

5. The aromatic polysulfone composition according to claim 1,
wherein the aromatic polysulfone (P2) has one or more selected from the group consisting of a halogen group, a hydroxy group, a methoxy group, and a phenyl group at a polymer chain terminal.

6. The aromatic polysulfone composition according to claim 1,
wherein a reduced viscosity (unit: dL/g) of the aromatic polysulfone (P2) is greater than or equal to 0.32.

* * * * *